United States Patent
Bedi et al.

(10) Patent No.: US 8,060,820 B2
(45) Date of Patent: Nov. 15, 2011

(54) COLLABORATIVE EDITING OF A DOCUMENT

(75) Inventors: Bharat V Bedi, Southsea (GB); Lucas W Partridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/598,909

(22) Filed: Nov. 14, 2006

(65) Prior Publication Data

US 2007/0118598 A1    May 24, 2007

(30) Foreign Application Priority Data

Nov. 22, 2005 (GB) .................................. 0523703.7

(51) Int. Cl.
*G06F 17/20* (2006.01)
(52) U.S. Cl. ..................... 715/256; 715/255; 715/271
(58) Field of Classification Search .......... 715/255–256, 715/271
See application file for complete search history.

(56) References Cited

U.S. PATENT DOCUMENTS

| | | | |
|---|---|---|---|
| 5,790,847 A * | 8/1998 | Fisk et al. ........................... | 707/4 |
| 6,243,722 B1 * | 6/2001 | Day et al. ...................... | 715/205 |
| 6,438,564 B1 | 8/2002 | Morton et al. | |
| 6,865,713 B1 | 3/2005 | Bates et al. | |
| 6,999,962 B2 | 2/2006 | Julliard et al. | |
| 7,461,151 B2 * | 12/2008 | Colson et al. ................. | 709/227 |
| 7,552,383 B2 | 6/2009 | Morris et al. | |
| 7,702,730 B2 * | 4/2010 | Spataro et al. ................. | 709/205 |
| 7,707,249 B2 * | 4/2010 | Spataro et al. ................. | 709/205 |
| 2003/0023679 A1 * | 1/2003 | Johnson et al. ................ | 709/204 |
| 2003/0060910 A1 * | 3/2003 | Williams et al. ................. | 700/91 |
| 2003/0097410 A1 * | 5/2003 | Atkins et al. ................... | 709/206 |
| 2003/0204490 A1 | 10/2003 | Kasriel | |
| 2004/0122843 A1 | 6/2004 | Terris et al. | |
| 2004/0205653 A1 * | 10/2004 | Hadfield et al. .............. | 715/530 |
| 2004/0267871 A1 * | 12/2004 | Pratley et al. ................. | 709/200 |
| 2005/0004986 A1 * | 1/2005 | Aoki et al. ..................... | 709/206 |
| 2005/0021624 A1 | 1/2005 | Herf et al. | |
| 2005/0033811 A1 | 2/2005 | Bhogal et al. ................. | 709/206 |

(Continued)

OTHER PUBLICATIONS

Office Action (Mail Date Jan. 21, 2010) for U.S. Appl. No. 11/626,946, filed Jan. 25, 2007; Confirmation No. 1101; pp. 1-18.*

(Continued)

*Primary Examiner* — Doug Hutton, Jr.
*Assistant Examiner* — Andrew Dyer
(74) *Attorney, Agent, or Firm* — George R. McGuire; Blaine T. Bettinger; Bond Schoeneck & King

(57) ABSTRACT

Disclosed is a method, apparatus and computer program for a first client to facilitate collaborative editing of a document with a second client. The document contains data of a first data type and is accessible by a first application for processing the first data type. The first application is used to identify a portion of the document for review, The identified portion is extracted and provided to an application for processing data of a second type at the first client. This application is a messaging application. A second client is identified for performing the review and the identified portion is sent via the messaging application to the identified second client. Comments are received back from the identified second client and these comments conform to the messaging application's protocol. The comments are then interpreted back at the first client and the document is updated if appropriate.

17 Claims, 10 Drawing Sheets

U.S. PATENT DOCUMENTS

| | | | | |
|---|---|---|---|---|
| 2006/0053194 A1* | 3/2006 | Schneider et al. | ............ | 709/204 |
| 2006/0053365 A1* | 3/2006 | Hollander et al. | ............ | 715/512 |
| 2006/0053380 A1* | 3/2006 | Spataro et al. | ................ | 715/753 |
| 2006/0282762 A1* | 12/2006 | Diamond et al. | ............. | 715/511 |
| 2007/0118794 A1* | 5/2007 | Hollander et al. | ............ | 715/512 |

OTHER PUBLICATIONS

Amendment filed Apr. 21, 2010 in response to Office Action (Mail Date Jan. 21, 2010) for U.S. Appl. No. 11/626,946, filed Jan. 25, 2007; Confirmation No. 1101; pp. 1-17.*

Office Action (Mail Date Jul. 8, 2010) for U.S. Appl. No. 11/626,946, filed Jan. 25, 2007; Confirmation No. 1101; pp. 1-18.*

Amendment filed Oct. 8, 2010 in response to Office Action (Mail Date Jul. 8, 2010) for U.S. Appl. No. 11/626,946, filed Jan. 25, 2007; Confirmation No. 1101; pp. 1-17.*

Notice of Allowance and Fee(s) due (Mail Date Dec. 8, 2010) for U.S. Appl. No. 11/626,946, filed Jan. 25, 2007; Confirmation No. 1101; pp. 1-13.*

Request for Continued Examination (RCE) Transmittal filed Jan. 25, 2011 for U.S. Appl. No. 11/626,946, filed Jan. 25, 2007; Confirmation No. 1101; pp. 1-3.*

Notice of Allowance and Fee(s) due (Mail Date Feb. 3, 2011) for U.S. Appl. No. 11/626,946, filed Jan. 25, 2007; Confirmation No. 1101; pp. 1-7.*

Perry et al., "Collaborative Editing within the Pervasive Collaborative Computing Environment", 5 pgs.

H. Shen et al., "Flexible Notification for Collaborative Systems", pp. 77-86.

grape-info.com/doc/win2000srv/ose, 12 pgs.

xhost.co.uk/faqs/msofficefaq.htm, 2 pgs.

office.microsoft.com/en-us/assistance/HA011382721033.aspx, 5 pgs.

gnome.org/~markmc/remote-desktop.txt, 19 pgs.

realvnc.com/howitworks.html, 3 pgs.

conferral.com/s-more-resources-recipient-faqs.html, 2 pgs.

pcmag.com/article2/0,1895,1853919.asp, 8 pgs.

Conferral.com/news/pdf, 4 pgs.

moonedit.com/, 1 pg.

pleasereview.com/overview.html, 2 pgs.

melbpc.org.au/pcupdate/2305/2305article9.htm, 7 pgs.

* cited by examiner

COLLABORATIVE EDITING OF A DOCUMENT

PRIORITY CLAIM

The present application claims priority to Great Britain Patent Application No. 0523703.7, filed Nov. 22, 2005, the entire disclosure of which is hereby incorporated by reference.

FIELD OF THE INVENTION

The invention relates to collaborative editing of a document.

BACKGROUND OF THE INVENTION

In today's society, there is frequently a need for users to collaborate in the production of their work. In the past, such collaboration was done using mechanisms such as meetings, the telephone and email. More recently instant messaging applications have proved to be another useful means by which collaboration can take place.

Such mechanisms however still require coordination of various users' suggestions and integration of accepted suggestions into an original design, document, presentation etc.

One option is to share the document with multiple users (e.g. via email or a shared repository such as that made available via Lotus Notes) and to use a facility such as "track changes" in Microsoft Word. Such collaborative working however involves each user loading the entire contents of the document on their machine and editing it in a suitable editor that has to be installed on the user's computer. For example Word documents are edited using Microsoft Word.

In addition to the examples given above, a number of companies facilitate the whole process with specially designed collaborative editing software.

For example, the MoonEdit program permits multiple editors to work on a document simultaneously, with each editor being assigned a different colour.

Microsoft® also provides Server Extensions for its Office suite which provide collaborative functionality. Users can publish their documents via the web and use inline discussions to discuss ideas within the context of a document itself. This is discussed by the Xhost company as part of their Microsoft Office FAQs.

Conferral also provide collaborative editing software. According to their press release, a document owner invites participants to join in the review process. Such software can be integrated on the inviter side within Microsoft Office. Having accepted the invitation, an invitee is provided with a secure connection back to the inviter's PC. Conferral advertise this software as needing no special editing software at the invitee end—all that is required is a web browser and Java™ functionality. (Java and all Java-based trademarks and logos are trademarks of Sun Microsystems, Inc. in the United States, other countries, or both.)

Such screen sharing software however tends to be relatively heavy weight. The user needs to remain connected to the inviter's PC and to receive frequent screen updates reflecting the entire document as users make concurrent edits. Such processing is network intensive. There is also a security risk incurred by sharing one's screen with another user—such software provides the other user with machine access.

SUMMARY OF THE INVENTION

According to a first aspect, there is provided a method for a first client to facilitate collaborative editing of a document with a second client, the document containing data of a first data type and being accessible by a first application for processing said first data type, the method comprising: using the first application to identify a portion of the document for review; extracting the identified portion; providing the identified portion to an application for processing data of a second type at the first client, the application being a messaging application; identifying a second client for performing the review; sending the identified portion via the messaging application to the identified second client; receiving comments back from the identified second client, the comments conforming to the messaging application's protocol; interpreting the comments; and updating the document if appropriate.

Preferably the comments received back from the identified second client comprise text suggested as a replacement for the identified portion. Such suggested text may be enclosed by delimiters which can be used to distinguish suggested text from actual comments.

In a preferred embodiment, it is then determined whether to accept the suggested text as a replacement for the identified portion. This may take the form of receiving an indication from a user of the first client.

Once the text has been accepted, the second client is preferably informed of this fact.

If the text is not accepted, further collaboration with the identified second client is permitted.

In accordance with a preferred embodiment, an indication may be received from a user of the first client that a previous version of the text has been accepted. This previous version may be the original text forming the identified version or a subsequent version.

Once a previous version has been accepted, the second client is preferably informed of this.

When the suggested text from the second client is accepted, the comments are preferably parsed to identify this text. This text is then preferably extracted and used to replace the identified portion with the suggested text.

Where further collaboration takes place with the second client, comments originating from both the first and second clients are preferably interpreted to identify text to replace the identified portion.

This preferably involves parsing the comments to identify the most recent version of text suggested as a result of the collaboration to replace the identified portion or to identify a first client user selected version of text suggested by one of the clients to replace the identified portion. Such text can then be extracted and used to replace the identified portion.

In one embodiment, it may be the second client's decision as to what text should be used to replace the identified portion.

In a preferred embodiment, the messaging application is an instant messaging application.

According to a second aspect, there is provided an apparatus for a first client to facilitate collaborative editing of a document with a second client, the document containing data of a first data type and being accessible by a first application for processing said first data type, the apparatus comprising: means for using the first application to identify a portion of the document for review; means for extracting the identified portion; means for providing the identified portion to an application for processing data of a second type at the first client, the application being a messaging application; means for identifying a second client for performing the review; means for sending the identified portion via the messaging application to the identified second client; means for receiving comments back from the identified second client, the comments conforming to the messaging application's protocol; means for interpreting the comments; and means for updating the document if appropriate.

According to a third aspect, there is provided a computer program comprising program code means adapted to perform the method of the first aspect when said program is run on a computer.

BRIEF DESCRIPTION OF THE DRAWINGS

A preferred embodiment of the invention will now be described, by way of example only, and with reference to the following drawings.

DETAILED DESCRIPTION OF THE INVENTION

Disclosed is a mechanism for collaborative editing of documents. Such a mechanism is discussed with reference to FIGS. 1 to 3. These figures should all be read in conjunction with one another.

For ease of explanation only, the invention will be described in terms of a word processing document being collaboratively edited by two parties, Alice and Bob. It should however be appreciated that the invention is not limited to a word processing system, but is equally applicable to other kinds of documents such as spreadsheets, presentations etc.

Figure 1A:
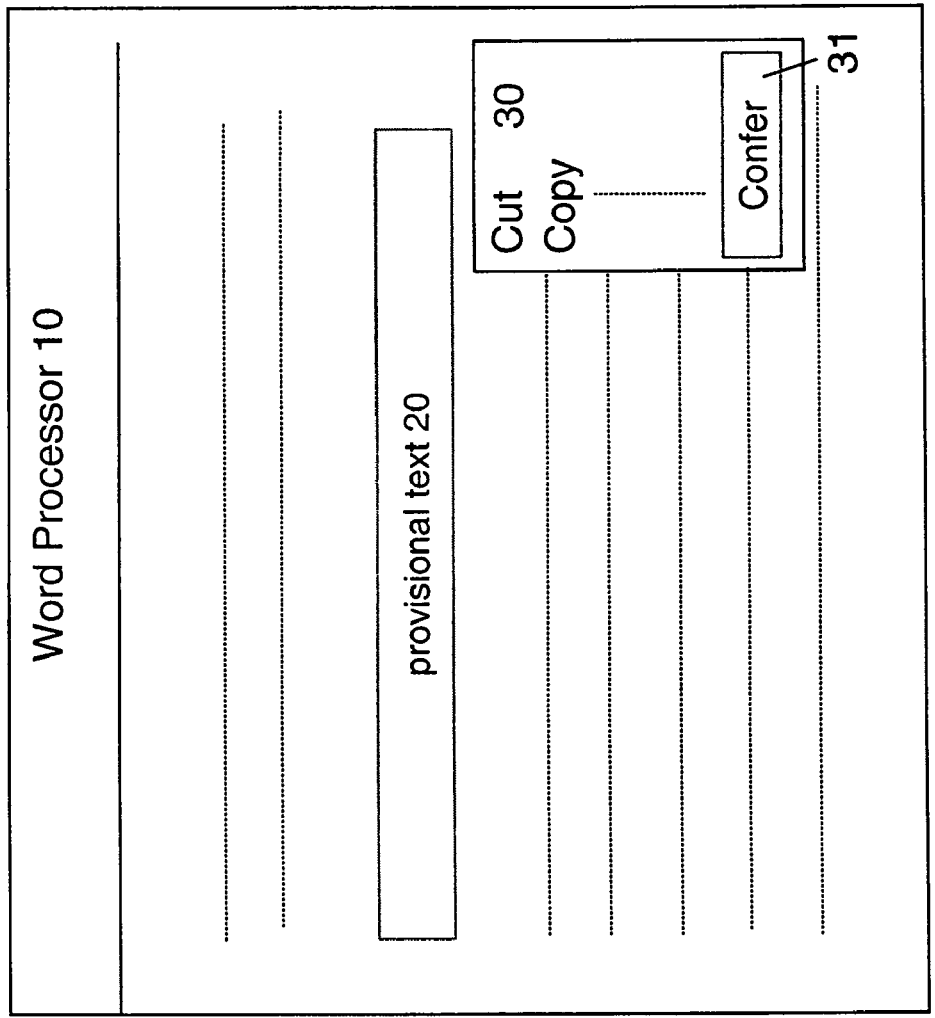
FIGS. 1a to 1e illustrate possible screen shots of a system including a preferred embodiment of the present invention.
Figure 2:
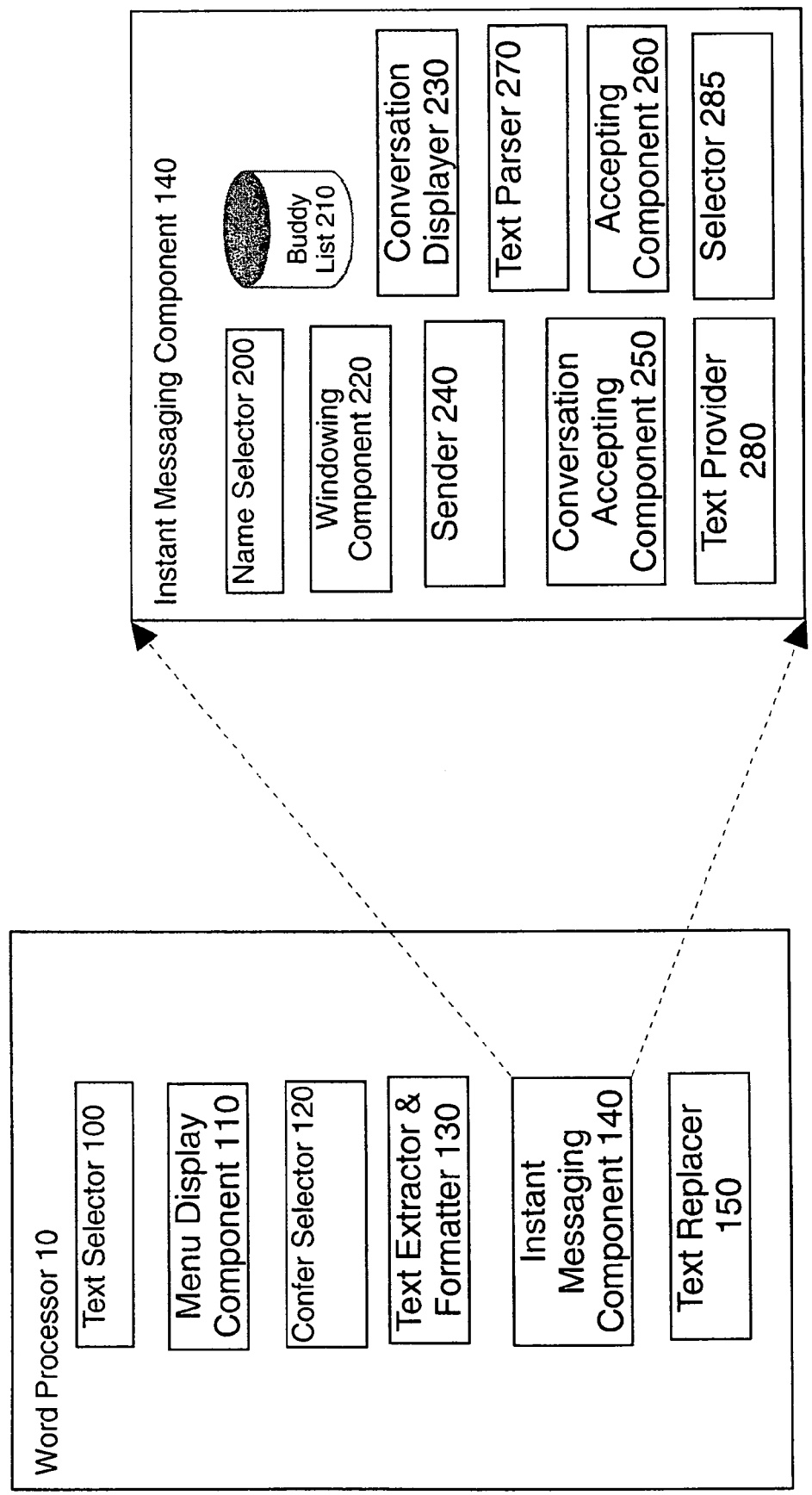
FIG. 2 shows a component diagram in accordance with a preferred embodiment of the present invention.

As shown in FIG. 1a, Alice's computer runs a word processor 10. This could, for example, be Microsoft® Word. The dotted lines in the figure represent the text of a document that Alice is currently working on.

In the process of writing the document, Alice desires to consult Bob on a portion of text designated for ease of understanding as "provisional text" 20. Alice selects the relevant text using text selector component 100 (step 300) and right clicks on the text to bring up a menu 30 (step 310). The menu is displayed using menu display component 110. It will be appreciated that steps 300 and 310 are already possibly in word processing applications today. These functions will not therefore be described in any more detail.

In the case of the preferred embodiment, the menu 30 displayed has an additional option of "Confer" 31. This option is selected to initiate the collaboration process at step 320 using confer selector component 120.

Figure 1B:
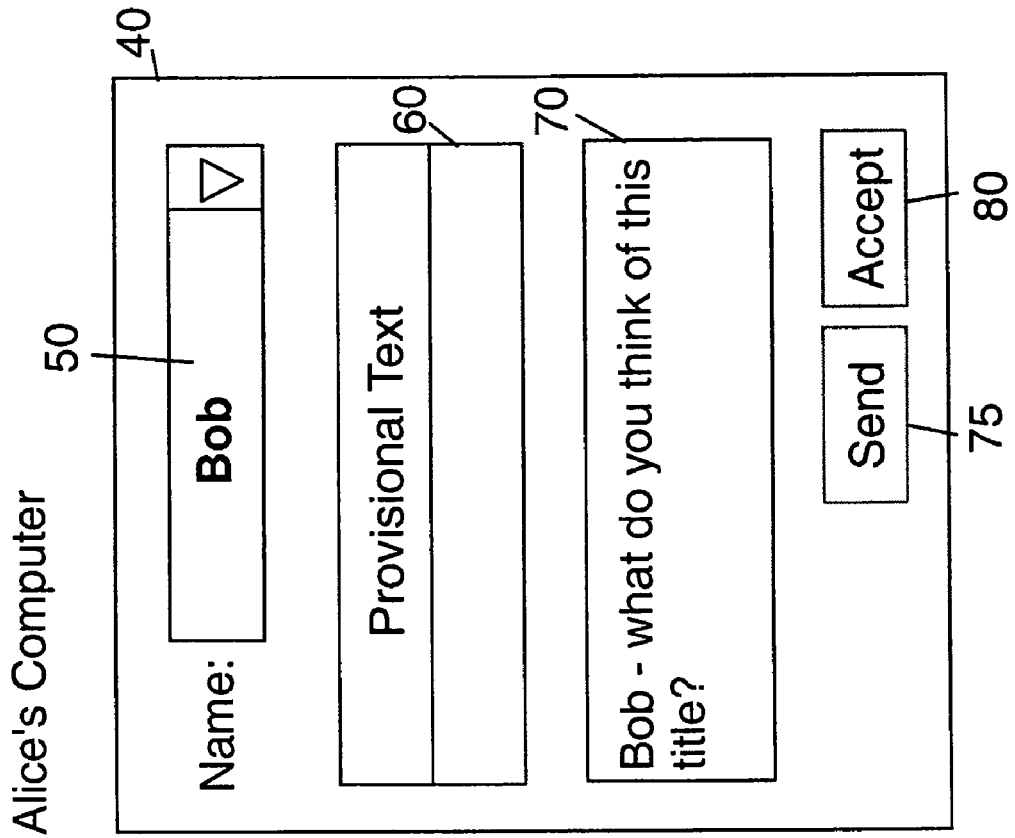

Upon selection of the confer option, instant messaging component 140 is launched on Alice's computer (step 330). FIG. 1b illustrates an exemplary screen shot. Windowing component 220 is responsible for this. It will be appreciated that the instant messaging component dialogue box looks very similar to that provided by traditional instant messaging software. The differences will now however be discussed.

A conversation window 60 of the type common in such software is provided. The main difference here is that this window also includes the provisional text 20 selected at step 300. Text Extractor and Formatter component 130 extracts the selected provisional text 20 using an operation similar to the known "cut" word processing operation. The text is placed on a clipboard (not shown) and is then formatted by component 130 to include enclosing delimiters <<provisional text>> (step 340). Component 130 then retrieves the text from the clipboard and provides it to the instant messaging component's conversation displayer component 230 (step 350). Component 230 "pastes" the reformatted provisional text into conversation window 60.

The instant messaging component also has a dialogue box 40 with a Name input field 50 The name field provides access to a drop down list of possible conferees. Such a list is preferably drawn from Alice's standard instant messaging buddy list 210. As with traditional instant messaging, if Bob is not online, his name is preferably "greyed out" (not selectable). Of course, instead of a drop down list, a standard instant messaging selection interface could be employed.

Name selector component 200 permits Alice to select a buddy to confer with. In this example, Alice selects Bob from her buddy list.

Conversation accepting component 250 then receives comments to associate with the provisional text 20 at step 380. Such comments are typed into window 70 as per a normal instant message. In the example of FIG. 1b, the provisional text is a title and the comments typed into window 70 by Alice might ask Bob for his opinion of the title. Alice then presses the send button 75 to transmit both the provisional text and the associated comments to Bob (step 390). Transmission of this information is achieved by sender component 240.

Figure 1C:
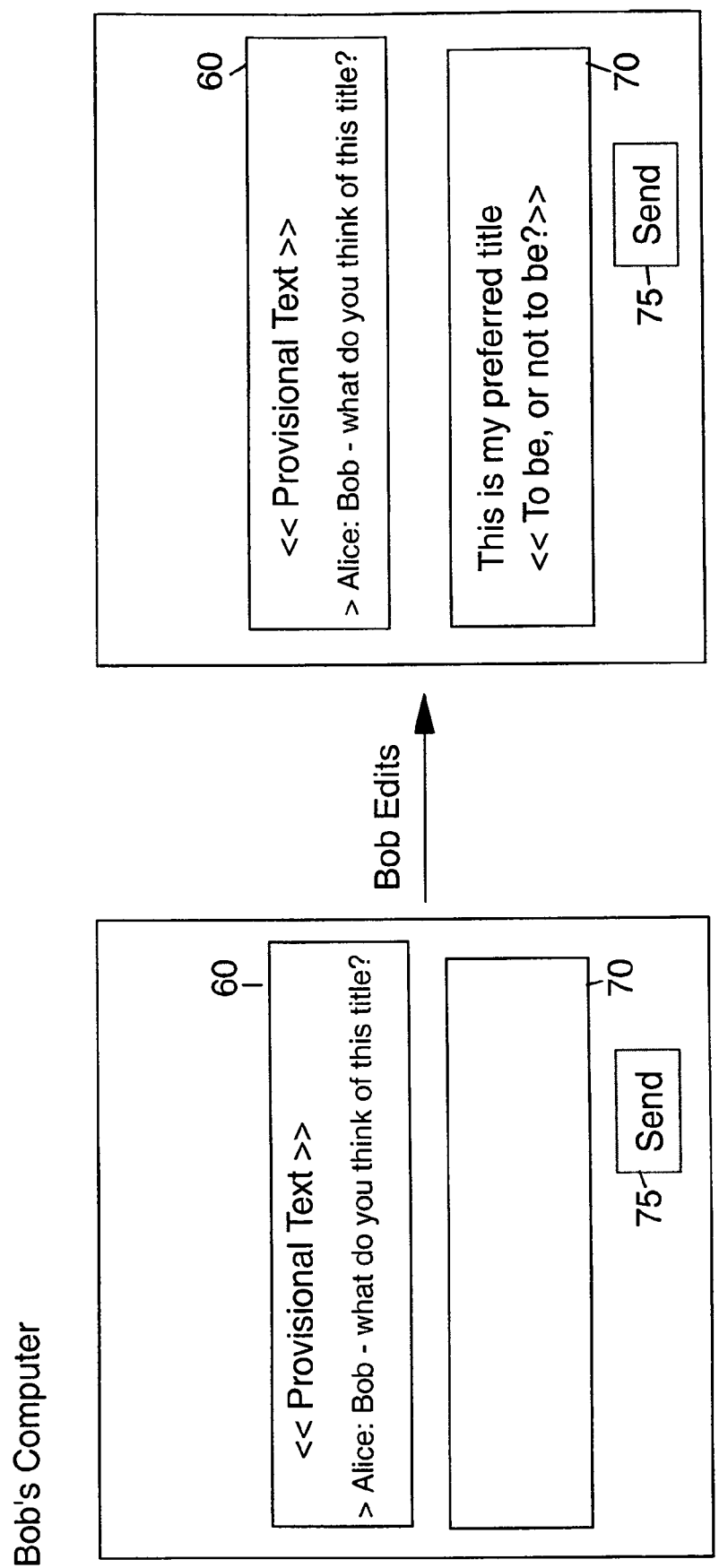
Figure 1D:
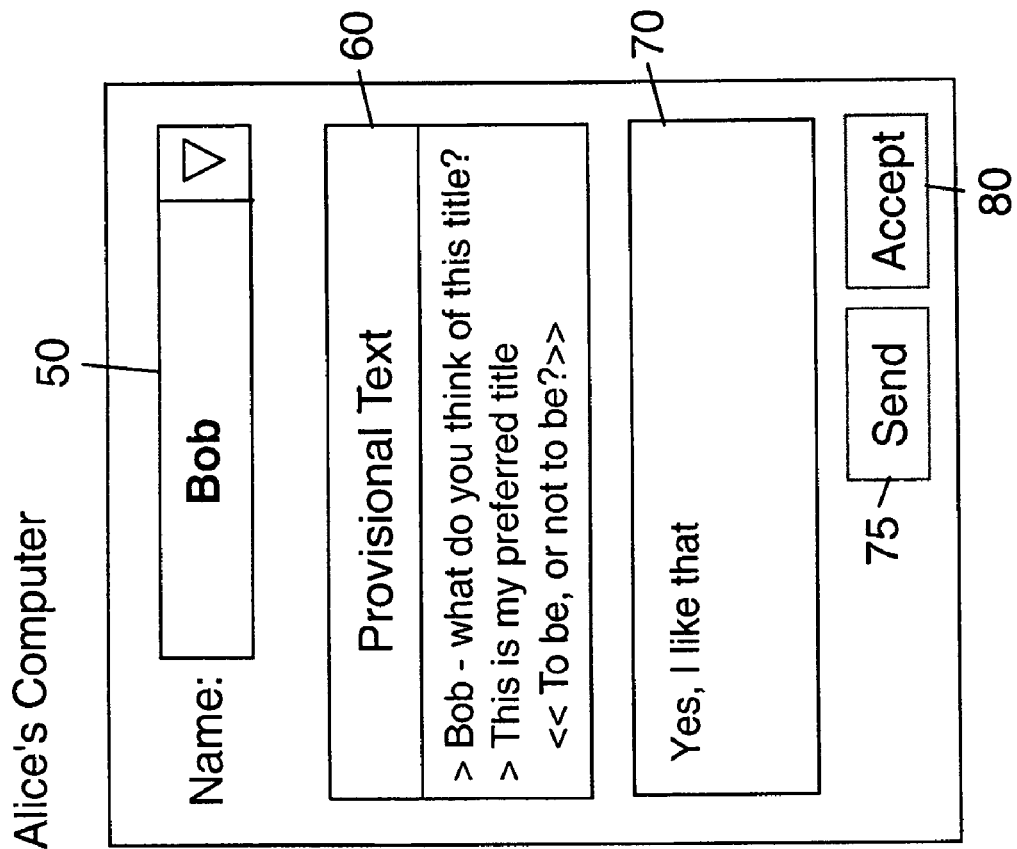

In the meantime, Alice's conversation window is updated (step 400) by conversation displayer component 230 such that Alice's conversation window includes the provisional text and associated comments sent to Bob (see for example FIG. 1d).

Bob's computer preferably hosts a similar instant messaging component. FIG. 1c illustrates a screen shot of what is displayed on Bob's computer. Standard instant messaging componentry receives the provisional text and associated comments from Alice and displays these in conversation window 60.

Bob is now able to review the provisional text and associated comments to determine whether any changes are required. Bob may type any such changes into input window 70.

Input received by window 70 may include comments (e.g. "This is my preferred title") and also new text. In the preferred embodiment, Bob places any new text inside delimiters <<new text>> in order to differentiate his comments from suggested text.

The information is then sent to Alice when Bob hits the send button 75.

The information is received on Alice's computer by conversation displayer component 230 and the conversation window 60 is updated at step 410. Alice's updated conversation window 60 is illustrated in FIG. 1d.

Alice then has the choice of whether or not to accept Bob's suggestions (step 420). If Alice wants to discuss the provisional text in more detail, then they both collaborate further. This is depicted via single step 430. It will be appreciated that such collaboration involves a typical instant messaging conversation, but with any suggestion for new text properly delimited as described earlier.

Figure 1E:
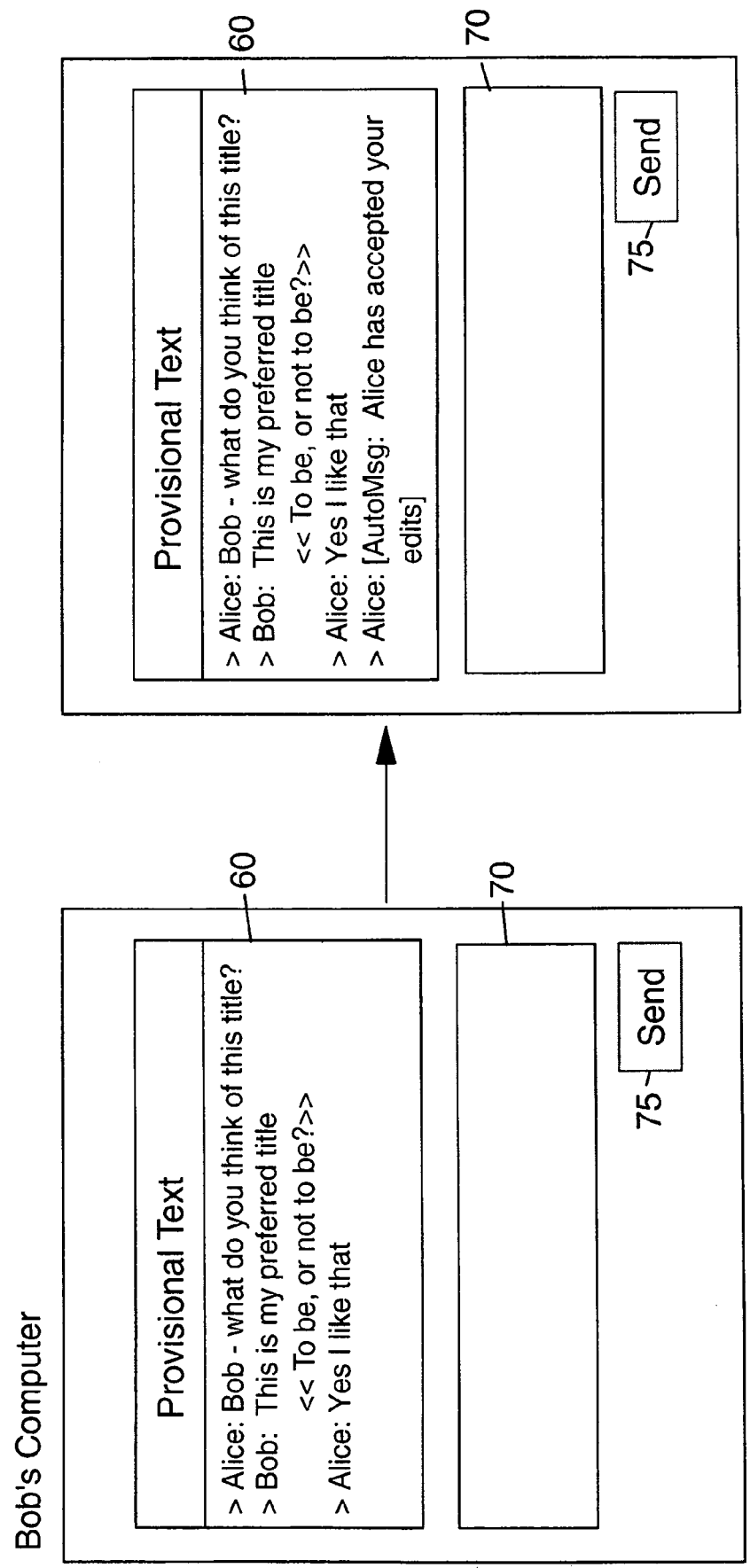

At some point Alice will decide to accept the text collaboratively arrived at step 420. At this point, she indicates as much to Bob via step 440 using conversation accepting component 250 and sender component 240 ("Yes I like that"). The information and the resulting update on Bob's screen are shown in FIG. 1e.

Alice then accepts the final form of the provisional text by clicking accept button 80 (step 450). Her action causes conversation accepting component 260 to generate an automatic message for transmission by sender component 240 to Bob (step 460). On Bob's screen a message is displayed indicating that Alice has accepted the most recent version of the text (see FIG. 1e). The message appears on Bob's screen as if it is from Alice but Alice's machine automatically generates the message as shown in the figure.

Note that in another embodiment, Alice does not specifically type text into input window 70 which indicates her acceptance. Instead only the auto-generated message is sent to Bob when Alice activates the Accept button.

In one embodiment, when Alice clicks on the Accept button the instant messaging window remains open for further discussion if required. Alice may also select different text in the master document, choose Confer again, and if she selects Bob again then that existing instant messaging window with Bob is simply be re-used. The conversation would carry on from where they left off but with the new text under discussion.

Further note that during collaboration Alice may decide to overrule Bob's suggestions. In this instance, Alice informs Bob via a standard instant message. She then selects (via selector component 285) the version of the text that she likes from the conversation window and clicks the accept button.

Thus once the accept button has been selected, text parser component 270 parses the conversation displayed in conversation window 60 in order to determine how to modify the word processing document (step 470).

Figure 3A:
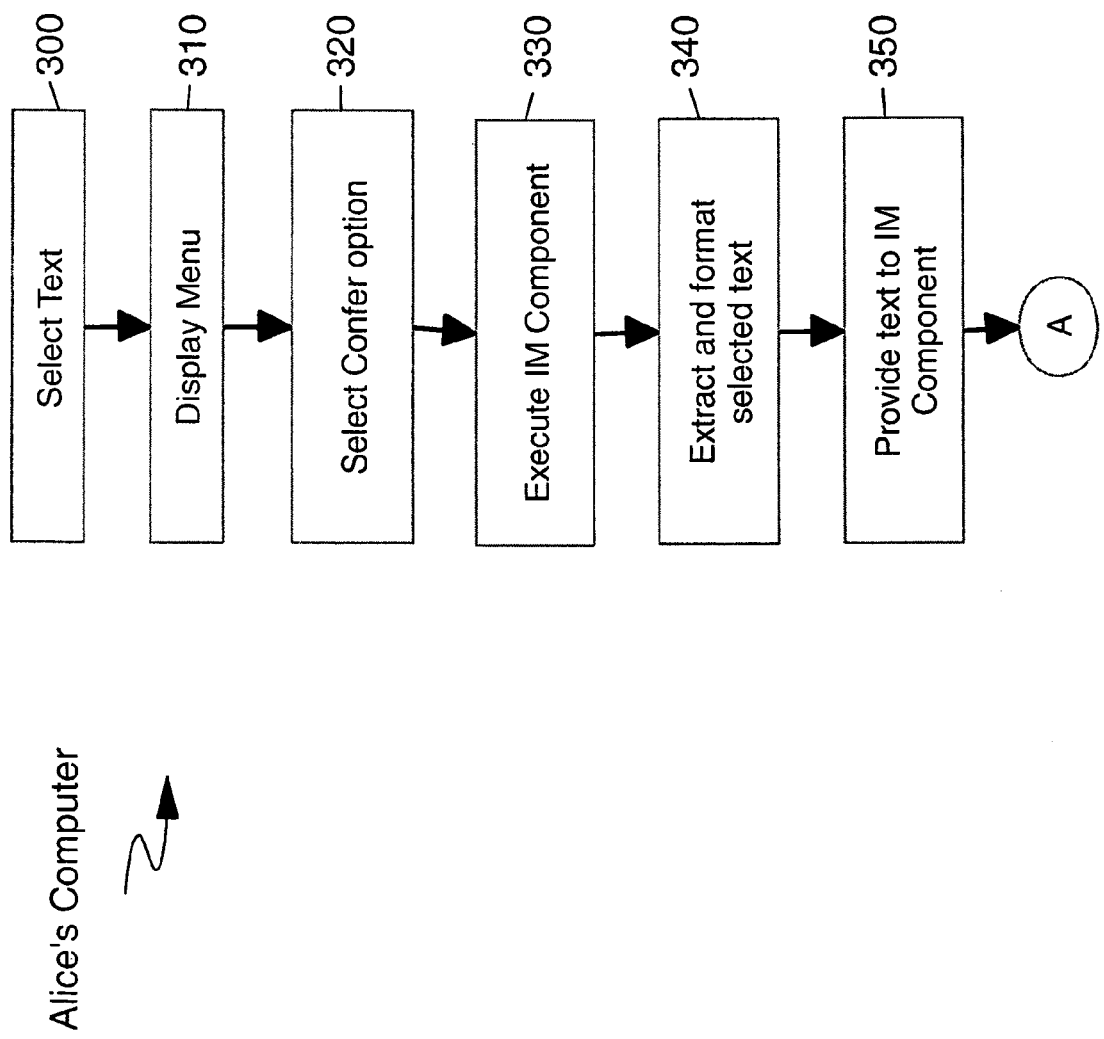
FIGS. 3a to 3d illustrate the processing of the present invention in accordance with a preferred embodiment.
Figure 3B:
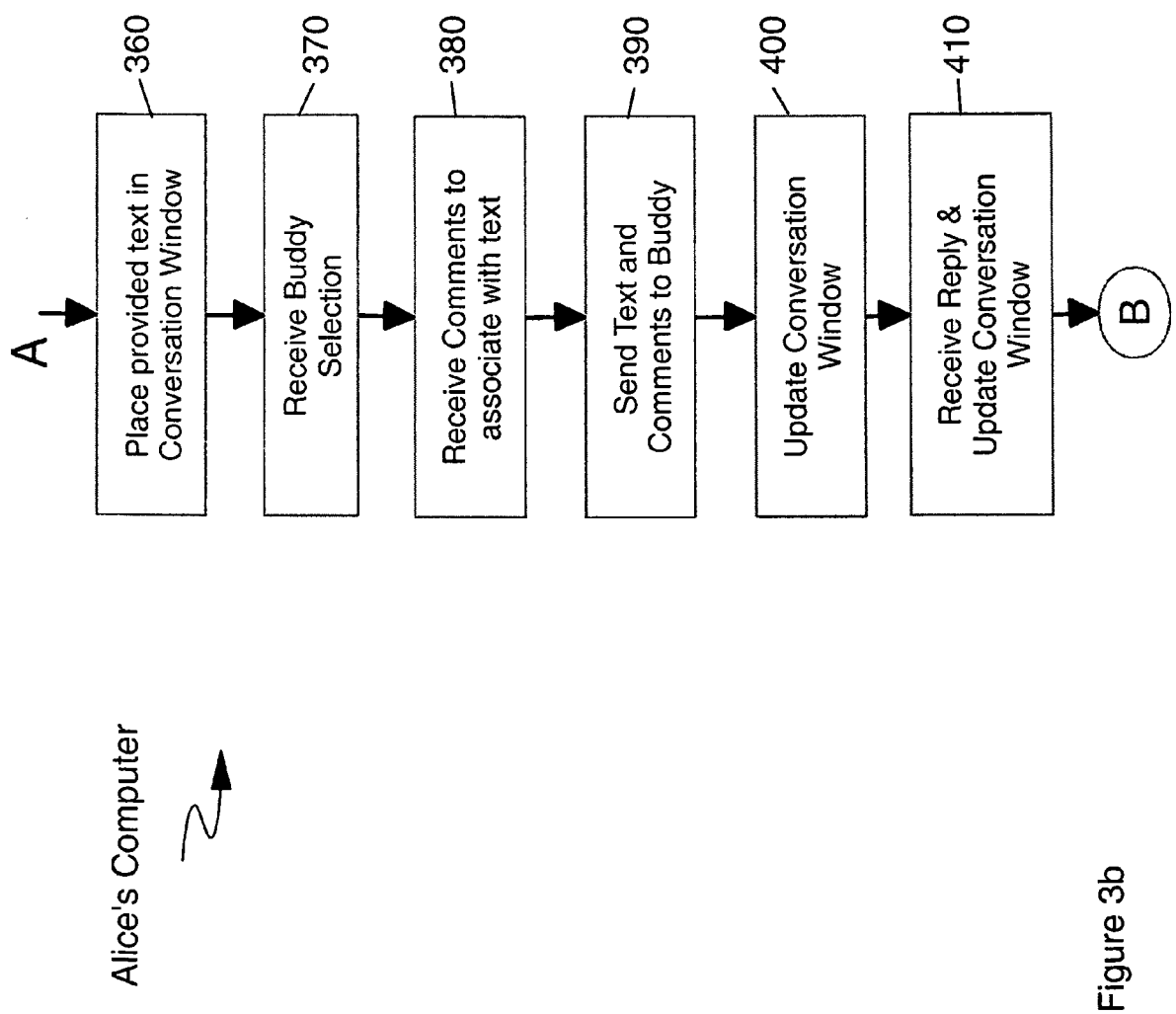
Figure 3C:
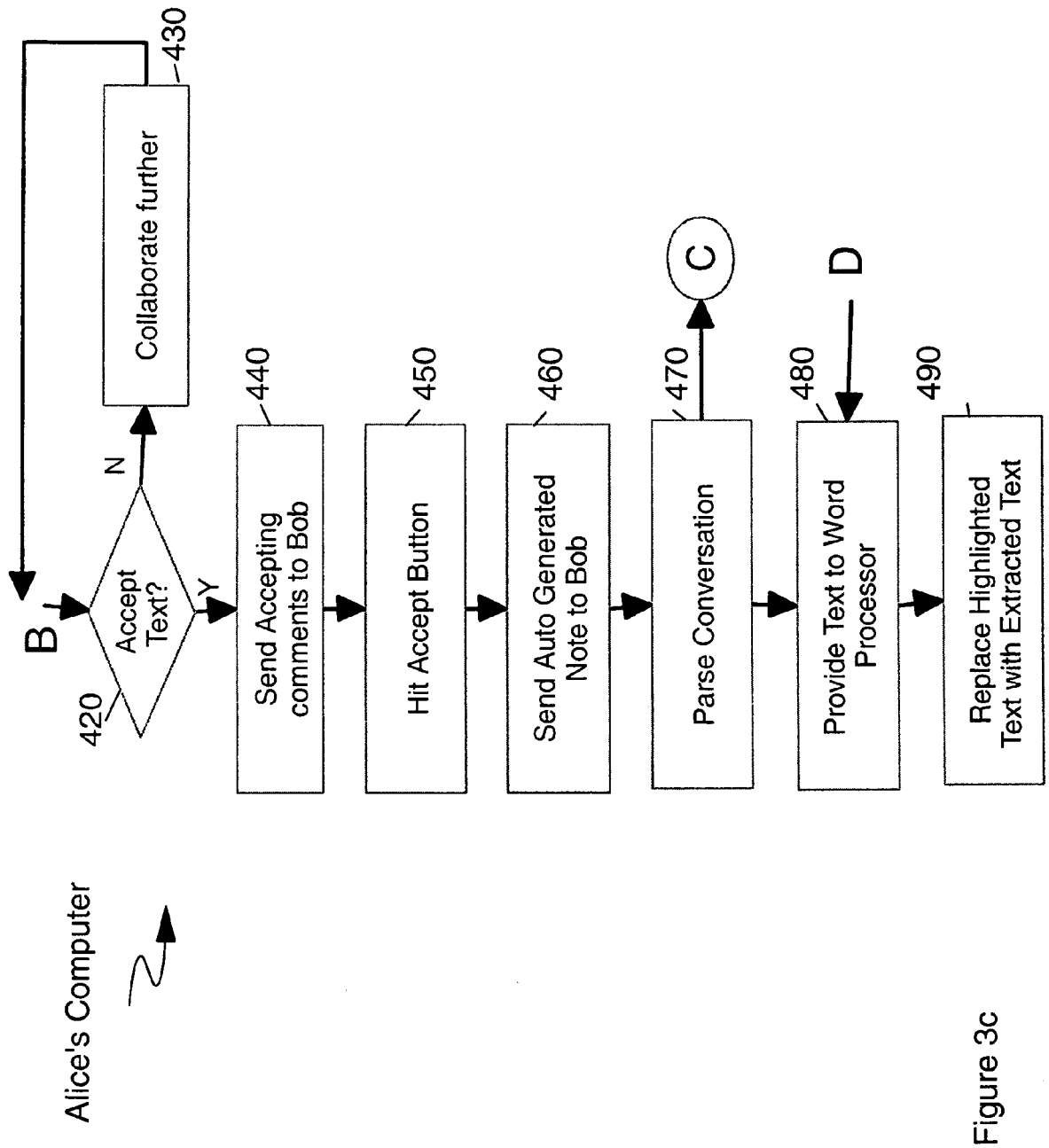
Figure 3D:
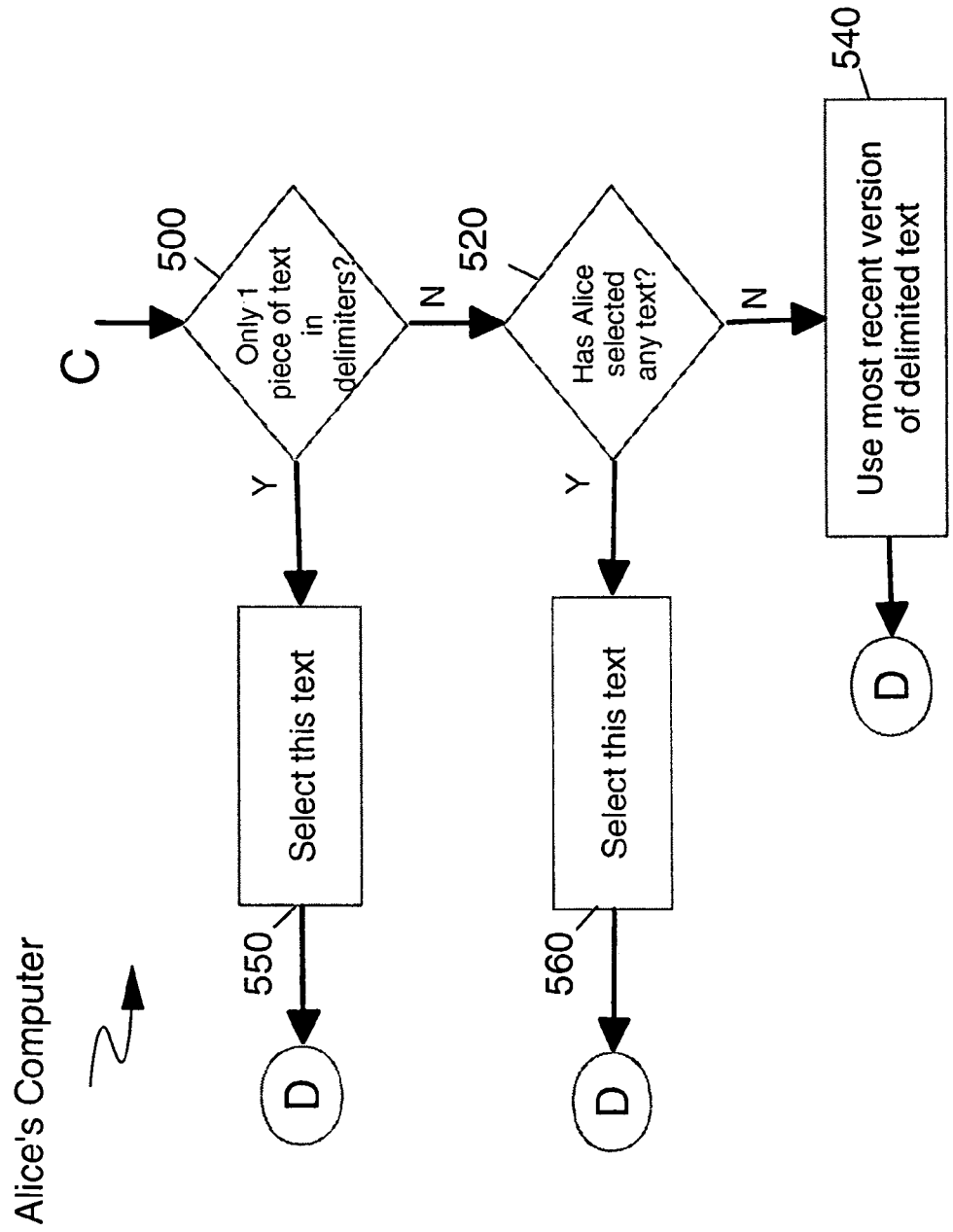

FIG. 3d illustrates, in accordance with a preferred embodiment, the processing involved in parsing the conversation, At step 500 it is determined whether the conversation only contains one piece of delimited text. If this is the case, then this text is the relevant text (step 550). If the answer is no, then a determination is made (step 520) as to whether Alice has selected any text herself (see above). If she has, then this text is identified as the relevant text (step 560). Otherwise, the most recent version of delimited text is selected by the parser component (step 540). (This will be the last occurrence of text surrounded by the special delimiters.)

The text parser component then extracts the selected text for incorporation into the word processing document. In some circumstances, the selected text may equate to the original text—in which case the parser does not make a replacement. In one embodiment, there may be a "disagree" button that could be selected in order, for example, either to leave the original text as it is, or to take a previous suggestion.

The extracted text is retrieved by text provider component 280 and is provided to word processor 10 (step 480). Text Replacer component 150 removes the special delimiters, deletes the selected text and replaces the deletion with the final version of the text (step 490).

The discussion thus far assumes a standard instant messaging client at the recipient (Bob's machine). It would however be possible to have a separate display area for storing the provisional text on Bob's machine and also on Alice's machine. Alternatively, special formatting tags could be used to distinguish the provisional text from the general conversation. These would be used by the parser component Alice's machine. The provisional text should still be displayed to the collaborators in a unique fashion—e.g. using bold or italics. In both cases the collaborators would not need to enter the special delimiters. In addition, Bob could be given the authorisation to indicate to Alice what text should be used in place of the provisional text—this would require modification to Bob's instant messaging software.

The invention has been described in terms of two people collaborating. It should be appreciated however that the invention is also applicable to collaboration with a number of people at the same time on a particular piece of text. For example, when Alice selects the "Confer" option she can choose more than one name to open up an instant messaging conference with (e.g., by selecting names in a drop down buddy list). She can still choose Accept at the end to decide which text to accept.

Whilst the invention has been described in terms of a word processing application, it should be appreciated that the invention is not limited to such. It is equally applicable to other applications and their associated documents; for example presentations, spreadsheets etc.

Further, the invention is not simply limited to the use of an instant messaging application. Other messaging applications such as email or SMS could be used.

The invention claimed is:

1. A method for a first client to facilitate collaborative editing of a document with a second client, the document containing data of a first data type and being accessible by a first computer application for processing said first data type, the method comprising:
    copying, using the first computer application, a portion less than the whole document for real-time review at the first and second clients;
    formatting, using the first computer application, the copied portion for real-time review;
    providing the copied portion to a second computer application for processing data of a second type at the first client, the second computer application being an instant messaging application, and wherein the providing the copied portion to the second computer application is initiated through a menu component of the first computer application;
    identifying a second client for performing the real-time review of the copied portion;
    sending the copied portion via the instant messaging application to the identified second client;
    receiving comments about the copied portion back from the identified second client, the comments conforming to the instant messaging application's protocol and wherein the step of receiving comments back from the identified second client comprises receiving text suggested as a replacement for the copied portion; and
    interpreting the comments about the copied portion.

2. The method of claim 1, wherein the suggested text is enclosed by delimiters.

3. The method of claim 1 further comprising determining whether to accept the suggested text as a replacement for the copied portion.

4. The method of claim 3 further comprising responsive to a negative determination, permitting further collaboration with the identified second client.

5. The method of claim 1, wherein the step of interpreting the comments comprises:
    parsing the comments to identify the suggested text; and
    extracting the suggested text, the method further comprising:
    replacing the copied portion with the suggested text.

6. The method of claim 1 further comprising receiving an indication from the second client that particular text suggested as a replacement for the copied portion is to be accepted.

7. An apparatus for a first client to facilitate collaborative editing of a document with a second client, the document containing data of a first data type and being accessible by a first application for processing said first data type, the apparatus comprising:
    a processor;
    means for copying, using the first application, a portion less than the whole document for real-time review at the first and second clients;

means for formatting, using the first computer application, the copied portion for real-time review;

means for providing the copied portion to an application for processing data of a second type at the first client, the application being an instant messaging application, and wherein the providing the copied portion to the second computer application is initiated through a menu component of the first computer application;

means for identifying a second client for performing the real-time review of the copied portion;

means for sending the extracted portion via the instant messaging application to the identified second client;

means for receiving comments about the copied portion back from the identified second client, the comments conforming to the instant messaging application's protocol and wherein the step of receiving comments back from the identified second client comprises receiving text suggested as a replacement for the copied portion; and means for interpreting the comments about the copied portion.

8. The apparatus of claim 7, wherein the suggested text is enclosed by delimiters.

9. The apparatus of claim 7, further comprising means for determining whether to accept the suggested text as a replacement for the copied portion.

10. The apparatus of claim 9, wherein the means for determining whether to accept the suggested text comprises means for receiving an indication from a user of the first client as to whether the suggested text has been accepted by the user.

11. The apparatus of claim 7 further comprising means, responsive to a negative determination, for permitting further collaboration with the identified second client.

12. The apparatus of claim 7, wherein the means for interpreting the comments further comprises:

means for parsing the comments to identify the suggested text; and means for extracting the suggested text, the apparatus further comprising:

means for replacing the copied portion with the suggested text.

13. A computer program stored on a computer readable storage medium, comprising:

program means for copying, using a first application, a portion less than the whole document for real-time review at the first and second clients;

program means for formatting, using the first computer application, the copied portion for real-time review;

program means for providing the copied portion to an application for processing data of a second type at the first client, the application being an instant messaging application, and wherein the providing the copied portion to the second computer application is initiated through a menu component of the first computer application;

program means for identifying a second client for performing the real-time review of the copied portion;

program means for sending the copied portion via the instant messaging application to the identified second client;

program means for receiving comments about the copied portion back from the identified second client, the comments conforming to the instant messaging application's protocol and wherein the receiving comments back from the identified second client comprises receiving text suggested as a replacement for the copied portion; and program means for interpreting the comments about the copied portion.

14. The computer program according to claim 13, further comprising program means for determining whether to accept the suggested text as a replacement for the copied portion.

15. The computer program according to claim 14, wherein the program means for determining whether to accept the suggested text comprises program means for receiving an indication from a user of the first client as to whether the suggested text has been accepted by the user.

16. The computer program according to claim 13, further comprising program means, responsive to a negative determination, for permitting further collaboration with the identified second client.

17. The computer program according to claim 13, wherein the program means for interpreting the comments comprises:

program means for parsing the comments to identify the suggested text;

program means for extracting the suggested text; and program means for replacing the copied portion with the suggested text.

\* \* \* \* \*